Jan. 5, 1943.  G. A. FISHER  2,307,398
PEANUT BUTTER PROCESS
Filed July 30, 1940
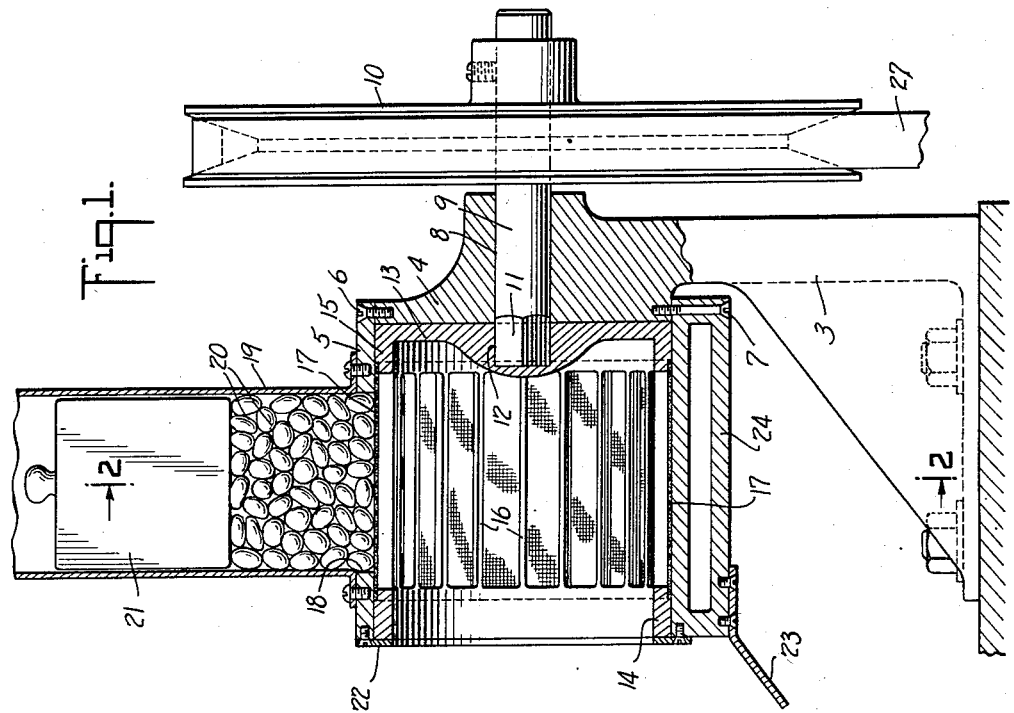
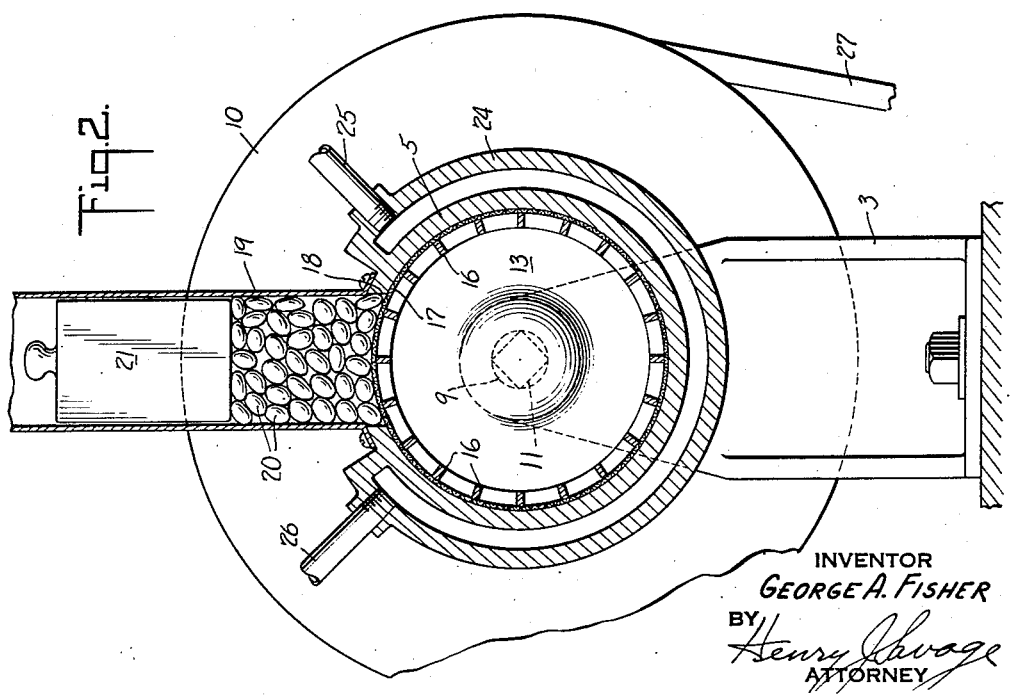
INVENTOR
GEORGE A. FISHER
BY
Henry Savage
ATTORNEY Patented Jan. 5, 1943

2,307,398

UNITED STATES PATENT OFFICE 2,307,398

PEANUT BUTTER PROCESS

George A. Fisher, Indianapolis, Ind., assignor to William S. Scull Company, Camden, N. J., a corporation of New Jersey Application July 30, 1940, Serial No. 348,335

3 Claims. (Cl. 99—128)

My invention pertains to a new peanut butter and the process for making it.

Peanut butter as made heretofore has been produced commercially by grinding the peanuts between mill stones, similar to the ancient way of grinding grain, or by grinding between revolving metal disks whose opposed faces are provided with roughened or ribbed surfaces so that the nuts are ground or torn to pieces between them. The pressure that must be exerted upon the nuts in grinding by these prior means is very great and yet the particles vary greatly in relative size and much of the cell structure of the nuts is ruptured so that oil soon separates out from the butter. This not only makes it unsightly, but also less palatable because the butter tends to adhere to the tongue and roof of the mouth, probably because of the free oily content and variation in size of the particles. Also, if the separated oil be not thoroughly remixed into the butter by the consumer, that in the bottom of the jar is too dry to be relished. Attempts have been made to prevent the separation of the oil from the butter by mixing other substances, such as glycerine, hydrogenated oils, and the like, with the ground peanuts. When used in the proper proportions, the substances are effective in preventing oil separation but destroy the pure nutty flavor of the butter. Another method of preventing oil separation is to limit the fineness of grinding but this makes the butter coarse and granular, destroys its smoothness and reduces its palatability.

According to my process the peanuts are comminuted to a uniformly fine butter with a minimum amount of cell rupture. Oil does not separate from the butter thus produced and I attribute this to the fact that the nuts are comminuted under light pressure, usually between 10 to 14 pounds per square inch and at a surface speed of 4 to 8 feet per second. This light pressure does not break down the cell structure and release the oil as does the usual commercial process of grinding under high pressure, although butter produced by my process is smoother to the taste and exhibits a finer, more uniform, granular structure under the microscope than do leading commercial brands with which it has been compared. Other advantages of butter made by my process are that it is easier to digest because of its uniform fineness, and its greater resistance to rancidity. Because of the non-separation of the oil, a stabilizer is not necessary, and the butter retains its pure nutty flavor long after non-stabilized commercial butters have become rancid under the same factors of temperature and exposure.

According to my process, I blend roasted nuts in the proportion necessary to produce the desired flavor, and after adding salt to suit, feed them under light pressure against the outer surface of a revolving hollow cylinder that is covered with a fine mesh wire cloth. The revolving screen comminutes the nuts into very fine particles of uniform size without crushing them. These fine particles pass through the screen into the hollow cylinder which is open at one end, from which the butter is removed continuously. The process is continuous, the nuts being supplied to the outer surface of the screen and the butter removed from within without interruption.

I have found that a surface speed of four to eight feet per second of the screen and a pressure of from ten to fourteen pounds per square inch exerted on the peanuts produces a fine grained, uniformly smooth butter from which the oil does not separate. However these limits are variable, depending upon the grade and kind of nuts being cut, the mesh of the screen and the size and shape of wire from which the screen is made. In determining the above stated limits of screen speed and nut pressure, I used a 30 mesh screen woven from round wire of .012 inch diameter. With a screen of coarser mesh and made from larger wire, the surface speed of the cylinder will be increased.

In the drawing I have illustrated one form of homogenizer for carrying out my process, wherein Fig. 1 is a longitudinal section through the device and Fig. 2 is a section taken substantially on the line 2—2 of Fig. 1.

A standard 3 is secured by bolts to the floor, a bench or other support and has a head 4 to which the stator or fixed cylinder 5 is secured, as by bolts 6, 7. The head 4 has a central bore 8 that provides a bearing for a shaft 9 to the outer end of which the driving pulley 10 is secured. The inner end of the shaft has a squared end 11 that fits in a similar socket 12 in the head 13 of the inner or cutting cylinder, or may be secured by other means.

The cutting cylinder has end rings 14, 15 joined by relatively narrow, but strong ribs 16, between which relatively wide spaces are provided. A cylindrical screen 17 fits snugly over these ribs and is supported thereby. The cylinder rings and screen fit rotatably in the stator 5 and are driven from the pulley 10 and shaft 9. The screen 17 fits closely within the stator 5, there being very little clearance between the two so that large pieces of the nuts cannot pass between them.

The stator has a feed opening 18 on its upper side over which the feed hopper 19 is secured. This hopper is filled with nuts 20 of the desired blend and a weight 21 is selected of such size as to force the nuts against the revolving screen 17 with the necessary degree of pressure. The revolving cylinder may be held in the stator by the retaining ring 22.

When the hopper has been filled, the rotor is started and the nuts, cut or rubbed off into very small particles of uniform fineness and smoothness, are forced through the screen 17 to the inside of the cylinder from which they are delivered as nut butter through the open end to the chute 23 and thence into any suitable receptacle.

Considerable heat is generated in the grinding that may have a deleterious effect on the butter. In order to keep the butter and apparatus cool, I may provide the stator 5 with a cooling jacket 24 having inlet and outlet connections 25, 26 for a cooling fluid.

The pulley 10 is driven at uniform speed by the belt 27 from an electric motor or other source of power.

While I have shown one form of apparatus for carrying out my process, it may be carried out by many other forms and types of apparatus. The wires for the screen may be of any cross section as round, square or triangular, and different shapes of wire will vary the degree or fineness of cutting. But I have found that round wires produce a butter with no oil separation.

In order to feed the nuts continuously to the cutting cylinder, I provide two hoppers 19 which are filled alternately, so as to keep the supply constant, or a single hopper may be supplied continuously by a screw feed that exerts the necessary pressure.

While I have referred to the action of the screen 17 as comminuting the nuts, it is difficult of exact definition, and also may be said to partake of the nature of a scraping, shearing, cutting or abrading action. It is to be distinguished from grinding or crushing under high pressure and from cutting with a sharp edged blade, in both of which the nut cells are ruptured and the particles are not of uniform size. The light pressure forces the nuts through the screen, or into its meshes, so that as the cylinder rotates, small particles are sheared or scraped off and pass immediately into the cylinder where they are not subjected to further pressure or grinding. This is in sharp contrast to the conventional grinding process wherein the crushed nuts remain between the grinding discs and are subjected to further and continued mashing, with consequent cell rupture and oil liberation. Due at least in part to the light pressure, the comminuted particles that are scraped, sheared or abraded from the nuts are so fine and uniform in size as to produce a smooth paste, yet without cell rupture sufficient to cause oil separation. Where I use the terms comminuting, cutting, shearing, and abrading, this action or its equivalent is to be understood.

Not only may the apparatus be embodied in many forms, but the process may be varied with the apparatus, the essential feature consisting in comminuting or finely dividing the nuts under a gentle pressure that produces a smooth, grainless butter to which nothing is added and from which the oil does not separate. This is in contrast to prior methods which exert a mashing or crushing action upon the nuts. This crushing effect ruptures the oil cells, produces non-uniform particle size and texture, and the expressed oil produces the undesirable sticking to the roof of the mouth that is characteristic of commercial peanut butters, prior to the present invention, except those that may have hard fats, glycerine, or other substances added to prevent oil separation.

Having thus described my invention, what I claim is:

1. The process of producing a nut butter which comprises feeding the nuts to a revolving fine mesh screen, exerting a light pressure on the nuts and against the screen, revolving the screen at a speed sufficient to comminute the nuts to form a uniformly smooth fine butter, the pressure and speed being insufficient to break down the cellular structure of the nuts and cause oil separation.

2. That process of producing a peanut butter which comprises feeding the nuts to a revolving fine mesh screen, exerting a pressure not exceeding fourteen pounds per square inch on the nuts and against the screen, revolving the screen at a surface speed not exceeding eight feed per second, whereby the nuts are comminuted to a uniformly smooth fine butter with a minimum of cell rupture.

3. That process of producing a peanut butter which comprises feeding the nuts to a revolving fine mesh screen composed of round wires of approximately .012 inch diameter, exerting a light pressure on the nuts and against the screen not exceeding fourteen pounds per square inch, and revolving the screen at a speed sufficient to comminute the nuts to form a uniformly smooth fine butter.

GEORGE A. FISHER.